United States Patent

Summers et al.

[15] 3,675,282
[45] July 11, 1972

[54] MECHANICAL FUSE

[72] Inventors: Stanley E. Summers, Woodland Hills; Clyde W. Seltzer, Santa Ana, both of Calif.

[73] Assignee: Ametek, Inc., New York, N.Y.

[22] Filed: Oct. 23, 1970

[21] Appl. No.: 83,367

[52] U.S. Cl. ...................... 24/230 SL, 24/201 S, 339/256 SP
[51] Int. Cl. ............................................................. A44b 17/00
[58] Field of Search ............ 24/201 S, 115 F, 230 LP, 230 SL, 24/230 SC, 230 BC, 230 R; 339/256 SF, 258 S

[56] References Cited

UNITED STATES PATENTS

| | | | |
|---|---|---|---|
| 441,285 | 11/1890 | Cook | 24/230 SL |
| 2,703,395 | 3/1955 | Long | 339/258 S |
| 1,703,579 | 2/1929 | Gaffner | 24/230 LP |
| 2,814,025 | 11/1957 | Wade | 339/258 S |
| 3,401,980 | 9/1968 | Nicholas | 24/230 SL |

FOREIGN PATENTS OR APPLICATIONS

| | | | |
|---|---|---|---|
| 207,696 | 3/1909 | Germany | 24/230 SL |
| 539,811 | 9/1941 | Great Britain | 339/256 SP |

*Primary Examiner*—Bernard A. Gelak
*Attorney*—Robert E. Strauss

[57] ABSTRACT

A mechanical fuse is described which links two members together in yieldable engagement permitting their separation when the separation forces exceed a predetermined value. The fuse comprises a female member having a housing with a slit in its wall for insertion of a tongue of the male member. A frustoconical spring washer is supported within the housing, and the washer supports a latch in the form of a button in its center aperture. The button is biased against the tongue of the male member and engages an aperture in this member. The sides of one or both of the aperture and button are bevelled so that a force applied to withdraw the tongue transmits a force component which compresses the spring washer. When this force component equals or exceeds the load of the washer, the washer withdraws and releases the tongue of the male member.

9 Claims, 8 Drawing Figures

PATENTED JUL 11 1972  3,675,282
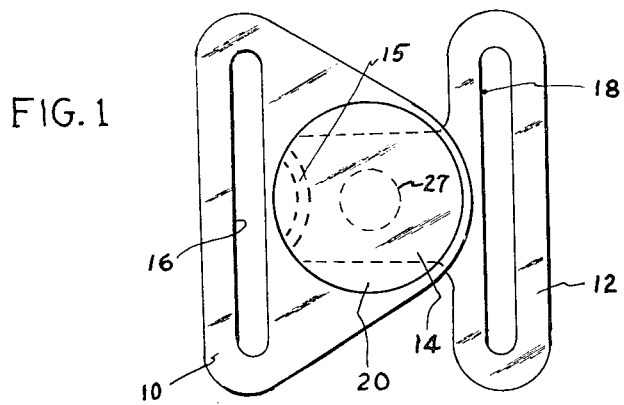
FIG. 1
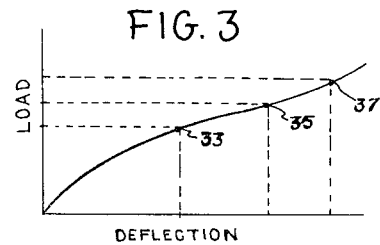
FIG. 3
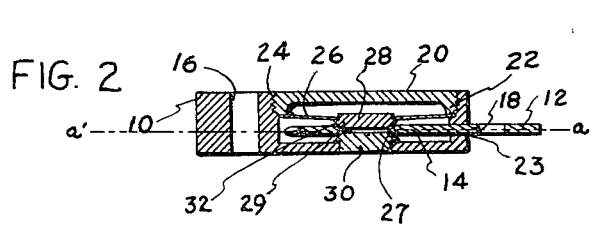
FIG. 2
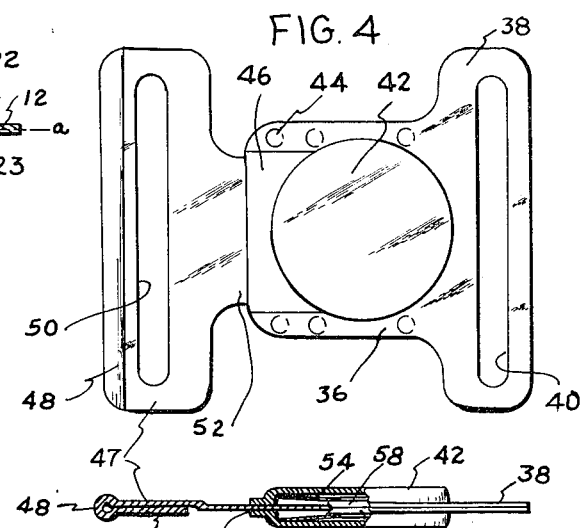
FIG. 4
FIG. 5
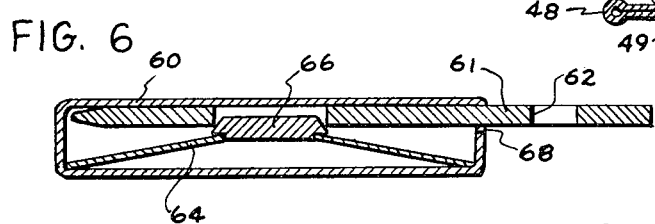
FIG. 6
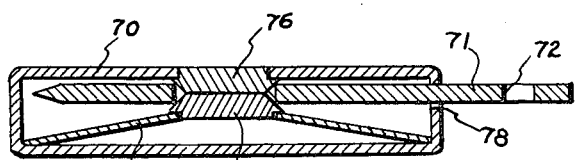
FIG. 7
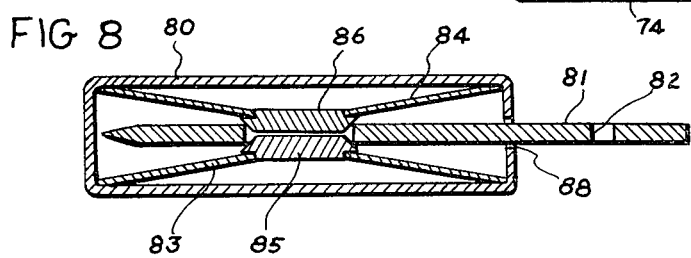
FIG. 8
INVENTOR
STANLEY E. SUMMERS
BY CLYDE W. SELTZER
Robert E. Shaw
ATTORNEY

MECHANICAL FUSE

DESCRIPTION OF THE INVENTION

This invention relates to a mechanical linking device and, in particular, relates to a yieldable linking device.

There exists a need for a device that will yieldably retain two members in engagement. A particular need exists for a compact device which will retain webbing members in engagement and precisely release them when the separation forces exceed a predetermined value. An application of such a device is for the packaging of emergency escape slides in commercial passenger aircraft. Such slides are inflatable and are packed in their deflated condition in the emergency exit doors of the aircraft. For compact storage, the deflated slide is folded with accordion pleats, and it is necessary that the pleats of the slide unfold sequentially when inflated. To obtain this sequential unfolding, a plurality of restraining webs are laid across the folds of the slide. Each web is fitted with a mechanical link that will fail when the separating force, which is exerted by the release of air pressure into the slide, exceeds a predetermined value. By providing a step-wise or incremental increase in release force of these links, the sequential unfolding of the slide can be achieved.

Successful adaption of this approach to emergency escape slides of an aircraft requires a high degree of reliability of operation. This can only be attained by use of mechanical links or fuse devices which are precise in operation. In addition, any device must be compact and, preferably, should be relatively inexpensive to manufacture.

It is an object of this invention to provide a mechanical fuse device which is precise in action.

It is also an object of this invention to provide such a device in a highly compact construction.

It is further an object of this invention to provide such a device that can be readily manufactured.

It is a related object of this invention to provide such a device which is adjustable to provide a variable restraint of its members.

Other and related objects will be apparent from the following description of the invention.

The preceding objects are achieved by this invention which comprises a female member having a wall with an aperture, a male member having an extended portion for insertion into said female member along an axis extending through the aperture, resilient spring means within said female member extending from a wall portion into an elevation which intersects the axis spring deflecting means on the leading edge of the male member to permit its insertion into the female member in a position having the resilient spring member biased against the extended portion of the male member and catch shoulder means on the male member whereby the resilient spring member is yieldably engaged and the male member is thereby secured in the female member against all forces less than a predetermined value. Various modifications and embodiments of this basic construction will be described and illustrated in the following paragraphs.

The invention will now be described by reference to the FIGURES, of which:

FIGS. 1 and 2 are plan and cross sectional views, respectively, of one embodiment of the invention;

FIG. 3 depicts the characteristics of the preferred resilient spring means used in the invention;

FIGS. 4 and 5 are plan and cross sectional views, respectively, of another embodiment of the invention; and FIGS. 6–8 are simplified views of various embodiments of the invention.

Referring now to FIG. 1, the device is shown as a pair of members, female member 10 and male member 12 having an extended portion or tongue 14 that is inserted in the member 10. The tongue has a concave, arcuate leading edge 15 and a centrally located aperture 27. Each member has attachment means whereby it can be secured to webbing such as canvas straps. This comprises a generally flat flange 12 with a slit 18 in the male member and a similar slit 16 in the female member to permit the insertion of the webbing straps. The female member 10 comprises a generally flat housing having a circular cavity, although any other geometrical shape can be used.

FIG. 2 illustrates a cross section of the device. The housing of member 10 has an aperture in its endwall. The aperture is in the form of a slit 23 which is of sufficient width and thickness to permit insertion of tongue 14 of member 12. Resilient spring means, in the form of a frustoconical spring washer 26 is contained within the housing. Other spring means such as leaf springs, etc. could also be used, however, the illustrated spring washers are preferred. The base of the spring means is supported on one of the flat inner walls of the housing. Member 12 is shown as inserted into member 10 along axis $a-a'$, and the upper end of the resilient spring means 26 projects into a position whereby and abutment means on its central portion either its central portion, or button 28 which is carried by its central portion, intersects axis $a-a'$. Tongue 14 of member 12 carries catch shoulder means to yieldably engage the resilient spring means or button 28 carried thereon. This can simply be an aperture 27 which receives button 28. A recession or depression in the surface of tongue 14 could also be used.

Button 28 has a neck portion which is inserted in the central aperture of spring washer 26 with an annular flange 29 to retain its neck in the central portion of the washer. Either or both of the mating surfaces of aperture 27 and button 28 can be bevelled to produce a directional force component that will compress the spring means 26 when a force is applied to withdraw member 12 from the housing of member 10. This is shown as the inclined side walls 32 of button 28.

The flat interior wall of housing of member 10 which is opposite button 28 can bear an opposed button 30, as shown. This wall is bored to receive the neck of button 30 which can be press-fitted into the bore with its bevelled flange projecting into the housing cavity. The resilient spring means 26 biases tongue 14 against this button with the aperture 27 engaged against the bevelled flange of button 28.

The device shown in FIGS. 1 and 2 has means for adjustment of the release force. This is accomplished by adjustable means for preloading the resilient washer 26 which is in the form of a disk 20 that has a rim 24 which is threaded on its outer edge to engage threads along the upper portion of the inside wall of housing 20. The under surface of rim 24 supports the outer extremities of the spring means 26 so that the advance or retraction of disk 20 in the housing increases or decreases, respectively, the preloading of the resilient spring means.

The spring washers are the preferred resilient spring means used in the device. These washers, commonly referred to as Belleville springs, are simple to manufacture and are very compact. They are also precise in operation since they can be resiliently loaded until a force is reached which will cause them to retract and release the tongue 14. The spring action of the Belleville springs results from the elastic deformation which occurs when the washer is forced to flatten out under an applied load. The characteristics of these Belleville springs is determined by the ratio of their unloaded height, i.e., initial cone height, to their thickness. When this ratio is about 2.0 and greater, a snap-like reversal of the spring can occur with increased loading. When the ratio is about 1.6 or less, a straight line load deflection relationship occurs. The preferred springs have height to thickness ratios from 1.6 to about 2.0, preferably from about 1.6 to about 1.8 and a load deflection characteristic such as shown in FIG. 3. The springs can be preloaded to the region 33 to 35 of this curve where a minor change in loading causes a major deflection. The region of adjustability of the spring washers can then be the region shown at 35 to 37 where the increase in preloading will increase the nominal pull out or release force of the device.

Any metal can be used for the washers, although stainless steel is preferred for corrosion resistance. Washers having thicknesses from 20 to about 25 mils are preferred. These washers will provide almost any degree of loading as determined by the diameters of their bases and central apertures. The precision of release over force of the washers which can be readily manufactured is within about ±5 percent.

The restraining force of the device is also dependent on the angle of inclination of the mating surfaces of the aperute 27 and the side walls of button 28. The inclination of one or both of these walls provides a force component which compresses the spring washer. The inclination of these walls can be varied from about 10° to 65°. Preferably the inclination is from 15° to about 45° to provide spring compressive forces that are the major force component of the applied force tending to withdraw member 12 from the housing of member 10.

To permit easy insertion of tongue 14 into housing of member 10, the device should have spring deflecting means to compress the spring 26 sufficiently to permit slipping the tongue between button 28 and the opposed top surface of button 30. This can simply comprise a bevel on the leading edge of tongue 14 as shown by the bevelled and concave leading edge 15 in FIG. 1. When this bevel is at a greater angle than the bevel of the sidewall of button 28, the force necessary to insert the tongue 14 into the housing of member 10 will be less than the restraining force of the device. Variation in the bevels of the leading edge 15 and the walls of buttons 28 and 30 and/or the wall of aperture 27 together with variation in the characteristics of the spring 26 can permit the design of devices that have widely varied engagement and disengagement forces.

FIGS. 4 and 5 show an alternative means for the invention comprising female member 38 and male member 47 having a tongue extension 52 that is inserted in slot 43 in the endwall of member 38. Each member has attachment means, slots 40 and 50 to permit attachment to canvas straps. The members can be formed from sheet metal. In a suitable construction, member 47 can have its outside end rolled as shown at 48 and bent under at 49 to provide reinforcement for the slot 50. Member 38 can be formed of upper and lower stamped half members which can be retained in assembly by spot welds 44 or other suitable means. Centrally positioned on each member is a circular depression 42 so that the assembly forms a housing having a central cavity defined by these stamped depressions. The slot 43 is in the endwall of the housing and is formed by a depression or groove 46 which can be stamped in one or both of the half members to intersect with the circular depression 42.

Disposed within the cavity of the housing is a pair of opposed spring means 54 and 56. The springs have their outer extremities supported by the flat inner walls of the housing and support, at their apex ends, buttons 58 and 60. The buttons are similar to those described with regard to FIGS. 1 and 2 and project into an opposed engagement along the plane of insertion of tongue 52. The tongue 52 has latch means comprising a depression or, preferably, an aperture so that the buttons 58 and 60 project into engagement with the aperture when the tongue 52 is inserted into the device.

FIGS. 6-8 show, in a simplified manner, various embodiments of the invention. In FIG. 6, a housing 60 is shown with a slot 68 in its endwall to permit insertion of the tongue of member 61. The resilient spring means 64, which can be a leaf spring or a spring washer such as described in FIGS. 1-5, is mounted with its outer extremities supported by a flat inner wall of the housing and with its inner portion projecting towards the tongue of member 61. Preferably, the spring means 64 carries button 66 and biases the button against member 61 so that the inclined side walls of the button engage the wall of the aperture in member 61. FIG. 7 illustrates a device having the tongue of the male member 71 biased against a button 76 rather than against the top inside wall of the housing as in the device of FIG. 6. This construction is similar to that shown in FIGS. 1 and 2 without any provision for adjustability of the preloading of the spring means 74. The device shown in FIG. 8 illustrates opposed spring means 83 and 84 which support buttons 85 and 86 in opposed relationship. This shows in a simplified sketch the arrangement of the springs and buttons of the device of FIGS. 4 and 5.

The invention has been described with regard to the presently preferred mode of construction. It is not intended that by this specific illustration the invention be unduly limited. Instead, it is intended that the invention be defined by the means and their obvious equivalents set forth in the following claims.

We claim:

1. A mechanical link having a male and female member yieldably engageable and secured against all forces less than a predetermined value but separable at forces greater than said value which comprises:
    a female member in the form of a flat, thin housing having an endwall with an aperture along a portion of its length;
    a male member having an extended portion of size permitting its insertion into said female member along an axis extending through said aperture;
    resilient spring means in the form of a frustoconical spring washer within said female member having an abutment means on the central portion of its convex face, with the base of said washer biased against one of the flat inner walls thereof and convexly oriented towards the opposite flat wall; and
    catch shoulder means on said male member whereby said abutment means of said resilient spring washer is yieldably engaged and said male member is thereby secured in said female member against all forces less than said predetermined value.

2. The link of claim 1 wherein the leading edge of said extended portion of said male member is bevelled whereby said member may be inserted into said female member to a position having said spring washer biased against said extended portion of said male member at a force less than said predetermined value.

3. The link of claim 1 wherein said catch shoulder means comprises an aperture in said extended portion of said male member.

4. The link of claim 1 wherein said spring washer abutment means is in the form of a button engageable with said catch means.

5. The link of claim 4 wherein the mating walls of at least one of the button and aperture are bevelled.

6. The link of claim 1 wherein said wall portion of said female member carries adjustment means permitting the preloading of said resilient spring means.

7. The link of claim 1 wherein said female member supports two resilient spring means in opposed orientation and projecting into engagement.

8. The link of claim 1 wherein said frustoconical spring washer is preloaded to the region of its characteristic load deflection curve exhibiting the greatest deflection for an incremental change in load.

9. The link of claim 6 wherein said adjustment means comprises a rim threaded on its outer edge and wherein said female member carries a threaded bore in which said rim is mounted with said frustoconical washer having its base portion seated on said rim whereby the advance and retraction of said rim in said threaded bore provides adjustable preloading of said spring washer.

* * * * *